United States Patent
Okazaki et al.

(10) Patent No.: US 7,088,760 B1
(45) Date of Patent: Aug. 8, 2006

(54) SOLID-STATE LASER APPARATUS INCLUDING IN RESONATOR LIGHT-TRANSMITTING ELEMENT HAVING RELATIVELY SMALL REFLECTANCE AT DESIRED WAVELENGTH

(75) Inventors: Yoji Okazaki, Kaisei-machi (JP); Hiroaki Hyuga, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/525,347

(22) Filed: Mar. 15, 2000

(30) Foreign Application Priority Data

Mar. 16, 1999 (JP) ................................. 11/070184

(51) Int. Cl.
*H01S 3/08* (2006.01)
(52) U.S. Cl. ......................................... 372/99; 372/108
(58) Field of Classification Search ................... 372/92, 372/11, 19, 99, 101, 22, 98, 107, 39, 68, 108
See application file for complete search history.

(56) References Cited

U.S. PATENT DOCUMENTS

| 5,226,054 A | 7/1993 | Yarborough et al. | |
| 5,351,251 A | 9/1994 | Hodgson | |
| 5,574,740 A | 11/1996 | Hargis et al. | |
| 5,657,341 A | 8/1997 | Hyuga | |
| 5,671,240 A | 9/1997 | Okazaki | |
| 5,761,227 A * | 6/1998 | Hargis et al. | 372/22 |
| 5,768,304 A * | 6/1998 | Goto | 372/98 |
| 5,854,802 A * | 12/1998 | Jin et al. | 372/22 |
| 5,978,392 A * | 11/1999 | Adachi | 372/21 |
| 6,026,101 A * | 2/2000 | Suzudo et al. | 372/22 |
| 6,130,900 A * | 10/2000 | Black et al. | 372/25 |
| 6,285,702 B1 * | 9/2001 | Caprara et al. | 372/92 |
| 6,289,029 B1 * | 9/2001 | Goto et al. | 372/32 |

* cited by examiner

*Primary Examiner*—Armando Rodriguez
(74) *Attorney, Agent, or Firm*—Stroock & Stroock & Lavan LLP

(57) ABSTRACT

A solid-state laser apparatus including a resonator in which oscillation of laser light occurs. An etalon is provided in the resonator for selecting a predetermined wavelength as a wavelength of laser light to be output from the solid-state laser apparatus. The etalon has at least one surface through which laser light passes, and is arranged so that at least one reflectance of the at least one surface at the above predetermined wavelength is smaller than reflectances of the at least one surface at wavelengths other than the predetermined wavelength. In addition, at least one resonator mirror of the resonator is arranged so that at least one reflectance of the at least one mirror at the above predetermined wavelength is greater than reflectances of the at least one mirror at wavelengths other than the predetermined wavelength.

6 Claims, 5 Drawing Sheets

SOLID-STATE LASER APPARATUS INCLUDING IN RESONATOR LIGHT-TRANSMITTING ELEMENT HAVING RELATIVELY SMALL REFLECTANCE AT DESIRED WAVELENGTH

BACKGROUND OF THE INVENTION

1. Field of the Invention

The present invention relates to a solid-state laser apparatus.

2. Description of the Related Art

As a conventional solid-state laser apparatus, Japanese Unexamined Patent Publication No. 7 (1995)-302946 proposes a solid-state laser apparatus in which a solid-state laser rod doped with a rare earth element such as neodymium is pumped by a semiconductor laser device (laser diode). In the solid-state laser apparatus, an etalon is provided in a resonator as a wavelength selection element so as to realize a single longitudinal mode. Currently, solid-state laser apparatuses having such a construction are widely used.

In some solid-state laser apparatuses having the above construction, a nonlinear laser optical crystal is arranged in the resonator so as to convert laser light emitted by the solid-state laser rod, into a second harmonic wave, for wavelength conversion. Such solid-state laser apparatuses are also widely used.

However, when an excitation power is increased in order to obtain a high output power in the conventional solid-state laser apparatuses having an etalon in a resonator, oscillation of undesired wavelengths occurs at the same time as oscillation of a desired wavelength. For example, in a solid-state laser apparatus, when laser light having a wavelength of 1,064 nm is desired, oscillation of laser light having wavelengths of 1,075 nm and 1,085 nm occurs concurrently. In another solid-state laser apparatus, when laser light having a wavelength of 946 nm is desired, oscillation of laser light having a wavelength of 938 nm occurs concurrently.

When oscillation of undesired wavelengths occurs, a portion of a total energy is taken by the oscillation of undesired wavelengths, and therefore the output power at the desired wavelength is decreased. When the aforementioned wavelength conversion is performed, the power of the second harmonic wave is also decreased.

SUMMARY OF THE INVENTION

The object of the present invention is to provide a solid-state laser apparatus in which oscillation of undesired wavelengths is suppressed, and oscillation of only a desired wavelength is stably maintained.

According to the first aspect of the present invention, there is provided a solid-state laser apparatus including a resonator in which oscillation of laser light occurs, and an etalon which is provided in the resonator for selecting a predetermined wavelength as a wavelength of laser light to be output from the solid-state laser apparatus. In the solid-state laser apparatus, the above etalon has at least one surface through which laser light passes, and the etalon is arranged so that at least one reflectance of the at least one surface at the above predetermined wavelength is smaller than reflectances of the at least one surface at wavelengths other than the predetermined wavelength.

According to the second aspect of the present invention, there is provided a solid-state laser apparatus comprising a resonator having at least one mirror. In the solid-state laser apparatus, the at least one mirror is arranged so that at least one reflectance of the at least one mirror at a predetermined wavelength is greater than reflectances of the at least one mirror at wavelength other than the predetermined wavelength when laser light of the predetermined wavelength is to be output from the solid-state laser apparatus.

According to the third aspect of the present invention, there is provided a solid-state laser apparatus including a resonator in which oscillation of laser light occurs; and an etalon which is provided in the resonator for selecting a predetermined wavelength as a wavelength of laser light to be output from the solid-state laser apparatus. In the solid-state laser apparatus, the etalon has at least one surface through which laser light passes, and the etalon is arranged so that at least one reflectance of the at least one surface at the above predetermined wavelength is smaller than reflectances of the at least one surface at wavelengths other than the predetermined wavelength. In addition, the resonator has at least one mirror which is arranged so that at least one reflectance of the at least one mirror at the above predetermined wavelength is greater than reflectances of the at least one mirror at wavelengths other than the predetermined wavelength.

When more than one wavelength can be oscillated by a solid-state laser medium used in the conventional solid-state laser apparatus having an etalon in a resonator, the surface of the etalon through which laser light passes is arranged so that a reflectance of the surface is maximized at a desired wavelength, i.e., reflectances of the surface at wavelengths other than the desired wavelength are smaller than the reflectance at the desired wavelength. Conventionally, such arrangement is made for suppressing variations in reflectance which are caused by a problem related to manufacture of the etalon.

However, the present applicants have found that the aforementioned drawbacks of the conventional solid-state laser apparatuses are caused by the above arrangement in which the reflectance of the etalon surface is maximized at a desired wavelength. That is, since the reflectances of the surface of the etalon at wavelengths other than the desired wavelength are arranged to be relatively small, oscillation of laser light having the wavelengths other than the desired wavelength occurs when a gain of a solid-state laser medium increases with an increase in the power of the excitation laser light.

On the other hand, according to the first aspect of the present invention, the at least one reflectance of the at least one surface of the etalon at the desired wavelength is smaller than the reflectances of the at least one surface at the wavelengths other than the desired wavelength. Therefore, finesse (i.e., selectivity of the longitudinal mode) is enhanced for the wavelengths other than the desired wavelength, and loss of the laser light having the undesired wavelengths increases. Thus, the oscillation of laser light having the undesired wavelengths is suppressed.

Otherwise, according to the second aspect of the present invention, the reflectance, at the desired wavelength, of the at least one mirror constituting the resonator is greater than the reflectances of the at least one mirror at the wavelengths other than the desired wavelength. Therefore, laser light having the wavelengths other than the desired wavelength can easily exit from the resonator through the mirror, compared with the laser light having the desired wavelength, and loss of the laser light having the undesired wavelengths increases. Thus, the oscillation of laser light having the undesired wavelengths is suppressed.

Since the solid-state laser apparatus according to the third aspect of the present invention comprises the provisions of both of the first and second aspects of the present invention, the solid-state laser apparatus according to the third aspect of the present invention has the above-mentioned advantages of both of the first and second aspects of the present invention.

DESCRIPTION OF THE PREFERRED EMBODIMENTS

Embodiments of the present invention are explained in detail below with reference to drawings.

First Embodiment

Figure 1:
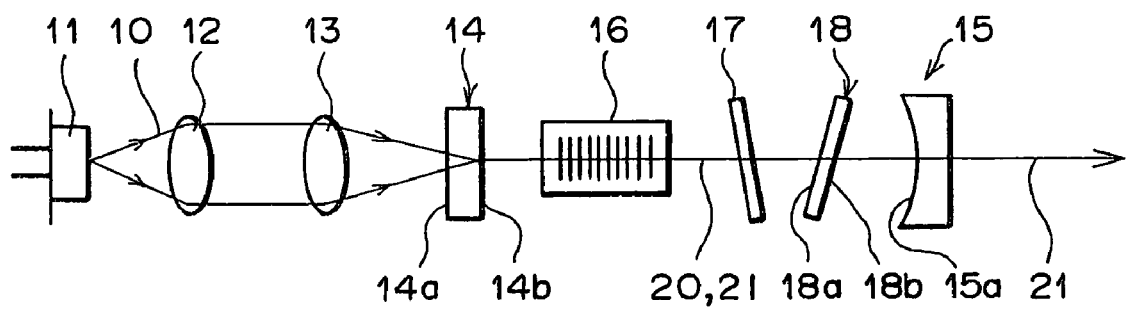
FIG. 1 is a diagram illustrating the construction of the solid-state laser apparatus as the first embodiment of the present invention.

FIG. 1 is a diagram illustrating the construction of the solid-state laser apparatus as the first embodiment of the present invention. The solid-state laser apparatus of FIG. 1 comprises a semiconductor laser device 11, a collimator lens 12, a condenser lens 13, a solid-state laser medium 14, a resonator mirror 15, an optical wavelength conversion element 16, a Brewster plate 17, and an etalon 18.

The semiconductor laser device 11 emits a laser beam 10 as pumping light. The collimator lens 12 collimates the laser beam 10, which is originally divergent light. The condenser lens 13 condenses the collimated laser beam. The solid-state laser medium 14 is a neodymium-doped $YVO_4$ crystal ($Nd:YVO_4$ crystal). The resonator mirror 15 is arranged on the forward side (right side in FIG. 1) of the $Nd:YVO_4$ crystal 14. The optical wavelength conversion element 16, the Brewster plate 17, and the etalon 18 are arranged between the $Nd:YVO_4$ crystal 14 and the resonator mirror 15. All of the above elements are integrated by mounting them on a common chassis (not shown), and are maintained at a predetermined temperature by a temperature control circuit (not shown) and a Peltier element (not shown).

The optical wavelength conversion element 16 is made of an MgO-doped $LiNbO_3$ crystal as a nonlinear optical material, and a periodic domain-inverted structure is formed in the MgO-doped $LiNbO_3$ crystal. The Brewster plate 17 functions as a polarization control element. The etalon 18 functions as a wavelength selection element for realizing single-wavelength oscillation.

The semiconductor laser device 11 emits the laser beam 10 having a wavelength of 809 nm. The $Nd:YVO_4$ crystal 14 emits light having a wavelength of 1,064 nm when neodymium ions in the $Nd:YVO_4$ crystal 14 are excited by the laser beam 10. Then, laser oscillation occurs in a resonator (which is explained later), and a solid-state laser beam 20 having the wavelength of 1,064 nm is obtained. The laser beam 20 is incident on the optical wavelength conversion element 16 to be converted into a second harmonic wave 21 having a wavelength of 532 nm, i.e., one-half the wavelength of the laser beam 20.

High-reflectance (HF) coating for the oscillation wavelength of the solid-state laser, i.e., 1,064 nm is provided on the outer end surface 14a (located on the side of the semiconductor laser device 11) of the $Nd:YVO_4$ crystal 14, and antireflection (AR) coating for the wavelength of 1,064 nm is provided on the inner end surface 14b of the $Nd:YVO_4$ crystal 14. In addition, other coating is provided on the mirror surface 15a of the resonator mirror 15, which is a concave mirror. The coating on the mirror surface 15a exhibits high reflectance at the wavelength of the solid-state laser, i.e., 1,064 nm, and allows passage therethrough of a portion of the second harmonic wave 21 having the wavelength of 532 nm.

Since the outer end surface 14a of the $Nd:YVO_4$ crystal 14 and the mirror surface 15a of the resonator mirror 15 are coated as above, the solid-state laser beam 20 resonates between the outer end surface 14a of the $Nd:YVO_4$ crystal 14 and the mirror surface 15a, and substantially only the second harmonic wave 21 exits from the resonator through the resonator mirror 15. That is, in this embodiment, the resonator of the solid-state laser is constituted by the $Nd:YVO_4$ crystal 14 and the resonator mirror 15.

Figure 2:
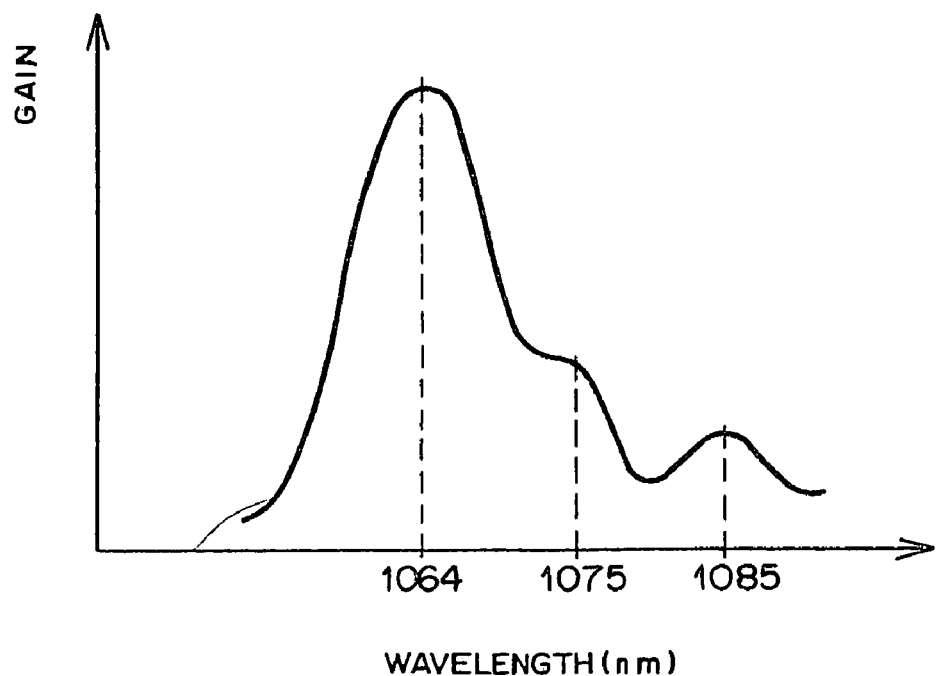
FIG. 2 is a graph illustrating the gain of the laser optical crystal used in the construction of FIG. 1.

FIG. 2 is a graph illustrating the gain of the laser optical crystal used in the construction of FIG. 1. As illustrated in FIG. 2, oscillation can occur at the wavelengths of 1,075 nm and 1,085 nm, in addition to the wavelength of 1,064 nm. The gains at the wavelengths of 1,075 nm and 1,085 nm are lower than the gain at wavelength of 1,064 nm. However, when the power of the semiconductor laser device 11 (as an excitation light source) is increased to about 2 W, oscillation can also occur at the wavelengths of 1,075 nm and 1,085 nm.

Figure 3:
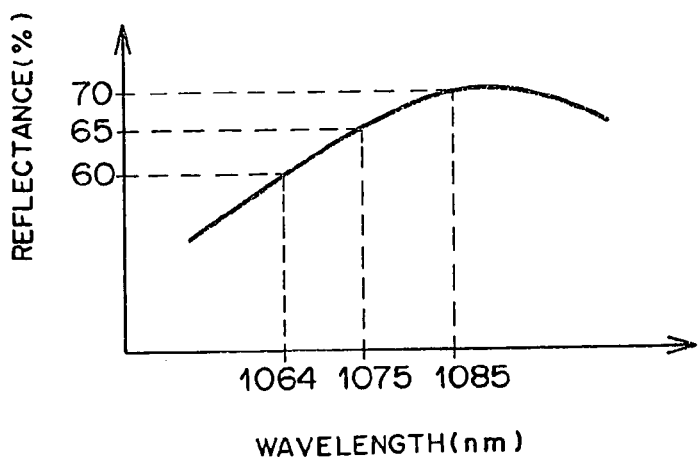
FIG. 3 is a graph illustrating the reflectance of the etalon used in the construction of FIG. 1.

In this embodiment, the above wavelength of 1,064 nm is required to be oscillated. In order to suppress oscillation at the other wavelengths such as 1,075 nm and 1,085 nm, reflectances of both end surfaces (light-transmitting surfaces) 18a and 18b of the etalon 18 are arranged as illustrated in FIG. 3 by appropriately coating the end surfaces 18a and 18b of the etalon 18. That is, the reflectances of the end surfaces 18a and 18b of the etalon 18 at the wavelength of 1,064 nm are arranged to be 60%, and the reflectances of the end surfaces 18a and 18b of the etalon 18 at the wavelengths of 1,075 nm and 1,085 nm are respectively set to be 65% and 75%, which are higher than the reflectances at the wavelength of 1,064 nm. In this embodiment, the tilt angle of the etalon 18 is 60'.

When the reflectances of the light-transmitting surfaces 18a and 18b of the etalon 18 are set as above, finesse (selectivity of the longitudinal mode) becomes great at the undesired wavelengths of 1,075 nm and 1,085 nm, and loss increases at the undesired wavelengths. Thus, oscillation of the undesired wavelengths of 1,075 nm and 1,085 nm can be suppressed.

Figure 4:
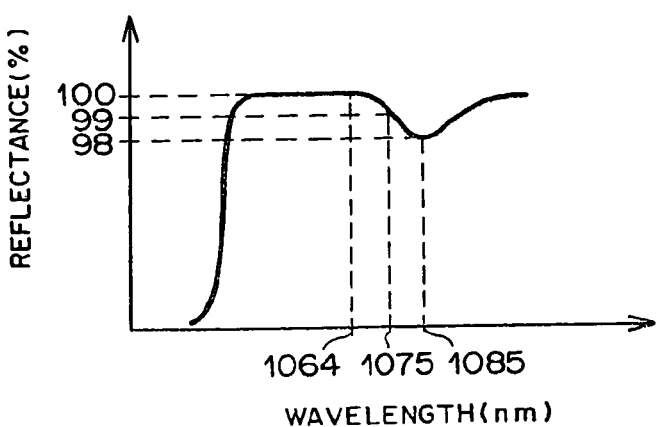
FIG. 4 is a graph illustrating the reflectance of the resonator mirror used in the construction of FIG. 1.

In this embodiment, in order to further suppress the oscillation at the undesired wavelengths such as 1,075 nm and 1,085 nm, the reflectance of the mirror surface 15a of the resonator mirror 15 is arranged as illustrated in FIG. 4. That is, the reflectance of the mirror surface 15a at the wavelength of 1,064 nm is arranged to be about 100%, and the reflectances of the mirror surface 15a at the wavelengths of 1,075 nm and 1,085 nm are respectively arranged to be 99% and 98%, which are lower than the reflectance at the wavelength of 1,064 nm.

When the reflectance of the mirror surface 15a is set as above, it becomes easier for light having the undesired wavelengths of 1,075 nm and 1,085 nm to pass through the resonator mirror 15 to exit from the resonator. Thus, oscillation of the undesired wavelengths of 1,075 nm and 1,085 nm can be further suppressed.

Figure 5:
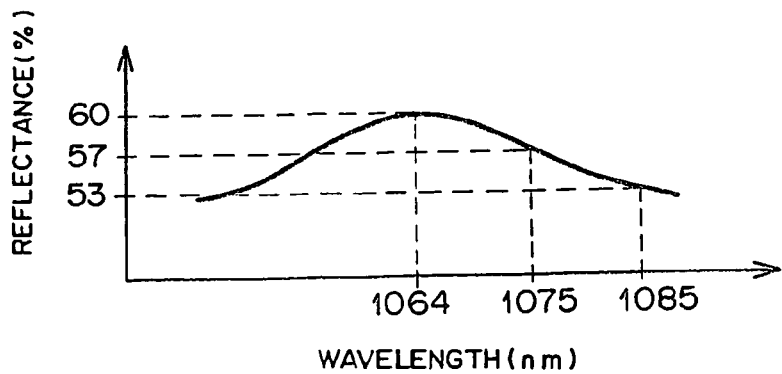
FIG. 5 is a graph illustrating the reflectance of a typical etalon used in a conventional solid-state laser apparatus.
Figure 6:
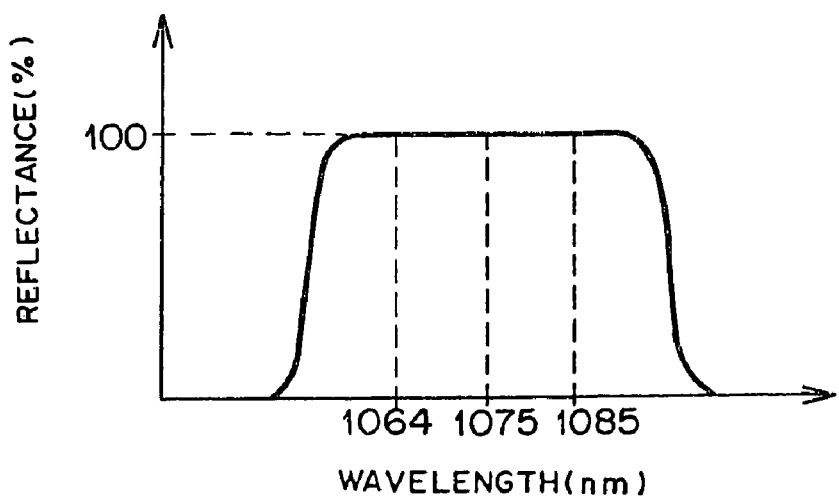
FIG. 6 is a graph illustrating the reflectance of a typical resonator mirror used in a conventional solid-state laser apparatus.

FIG. 5 is a graph illustrating the reflectance of a typical etalon used in a conventional solid-state laser apparatus, and FIG. 6 is a graph illustrating the reflectance of a typical resonator mirror used in a conventional solid-state laser apparatus. That is, in conventional solid-state laser apparatuses, the reflectances of light-transmitting surfaces of an etalon are arranged to be maximized at the desired wavelength of 1,064 nm, as illustrated in FIG. 5, and the reflectances of a mirror surface of a resonator mirror at the desired wavelength of 1,064 nm and the undesired wavelengths of 1,075 nm and 1,085 nm are arranged to be identical, as illustrated in FIG. 6.

As described above, in this embodiment, the reflectances of all of the end surfaces 18a and 18b of the etalon 18 and the mirror surface 15a of the resonator mirror 15 are arranged as above so as to further suppress the oscillation of the undesired wavelengths of 1,075 nm and 1,085 nm. However, when the arrangement of the reflectances is made only in the end surfaces 18a and 18b of the etalon 18, or when the arrangement of the reflectances is made only in the mirror surface 15a of the resonator mirror 15, the oscillation of the undesired wavelengths is still effectively suppressed. Nevertheless, further effective suppression of the undesired wavelengths can be achieved when the arrangement of the reflectances is made in all of the end surfaces 18a and 18b of the etalon 18 and the mirror surface 15a of the resonator mirror 15 as in this embodiment.

In addition, in this embodiment, the Brewster plate 17, as a polarization control element, is formed by a birefringent filter, so as to increase the loss at the undesired wavelengths of 1,075 nm and 1,085 nm. Therefore, even if the power of the semiconductor laser device 11 is increased from the aforementioned amount (i.e., about 2 W) to 3 or 4 W, oscillation occurs at only the desired wavelength of 1,064 nm. Further, in the above construction, no further birefringent filter for wavelength selection is required to be inserted into the resonator. Therefore, it is possible to avoid increase in optical loss and length of the resonator, while the optical loss and the length of the resonator will increase if the birefringent filter is inserted.

The Nd:YVO$_4$ crystal 14 does not have an oscillation line having a wavelength shorter than 1,064 nm. Therefore, the arrangement of the reflectances of the end surfaces 18a and 18b of the etalon 18 is very simple as illustrated in FIG. 3, and thus the coating of the end surfaces 18a and 18b of the etalon 18 can be easily designed.

Second Embodiment

Figure 7:
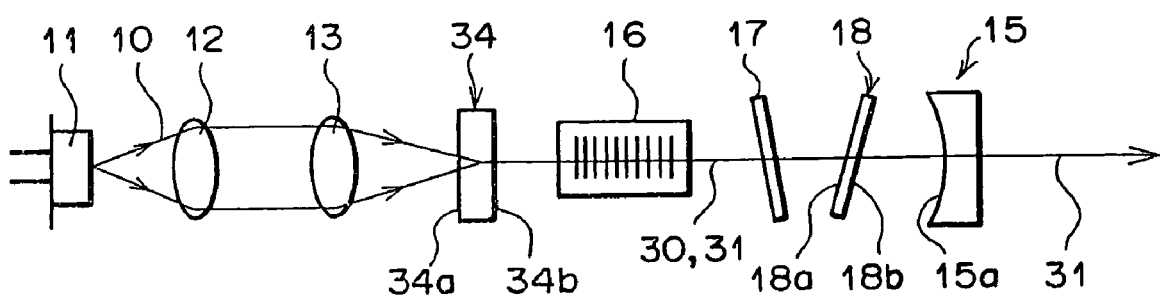
FIG. 7 is a diagram illustrating the construction of the solid-state laser apparatus as the second embodiment of the present invention.

FIG. 7 is a diagram illustrating the construction of the solid-state laser apparatus as the second embodiment of the present invention. In FIG. 7, elements having the same reference numbers as FIG. 1 have the same function as the corresponding elements in FIG. 1.

The solid-state laser apparatus in the second embodiment of the present invention is also a semiconductor-laser-excited solid-state laser apparatus. However, in the construction of FIG. 7, an Nd:YAG crystal 34 is used as the solid-state laser medium. The Nd:YAG crystal 34 emits light having a wavelength of 946 nm when neodymium ions in the Nd:YAG crystal 34 are excited by the laser beam 10 having the wavelength of 809 nm. Then, laser oscillation occurs in a resonator (which is explained later), and a solid-state laser beam 30 having the wavelength of 946 nm is obtained. The laser beam 30 is incident on the optical wavelength conversion element 16 to be converted into a second harmonic wave 31 having a wavelength of 473 nm, i.e., one-half the wavelength of the laser beam 30.

High-reflectance (HF) coating for the oscillation wavelength of the solid-state laser, i.e., 946 nm is provided on the outer end surface 34a (located on the side of the semiconductor laser device 11) of the Nd:YAG crystal 34, and antireflection (AR) coating for the wavelength of 946 nm is provided on the inner end surface 34b of the Nd:YAG crystal 34. In addition, other coating is provided on the mirror surface 15a of the resonator mirror 15, which is a concave mirror. The coating on the mirror surface 15a exhibits high reflectance at the wavelength of the solid-state laser, i.e., 946 nm, and allows passage therethrough of a portion of the second harmonic wave 31 having the wavelength of 473 nm.

Since the outer end surface 34a of the Nd:YAG crystal 34 and the mirror surface 15a of the resonator mirror 15 are coated as above, the solid-state laser beam 30 resonates between the outer end surface 34a of the Nd:YAG crystal 34 and the mirror surface 15a, and substantially only the second harmonic wave 31 exits from the resonator through the resonator mirror 15. That is, in this embodiment, the resonator of the solid-state laser is constituted by the Nd:YAG crystal 34 and the resonator mirror 15.

Figure 8:
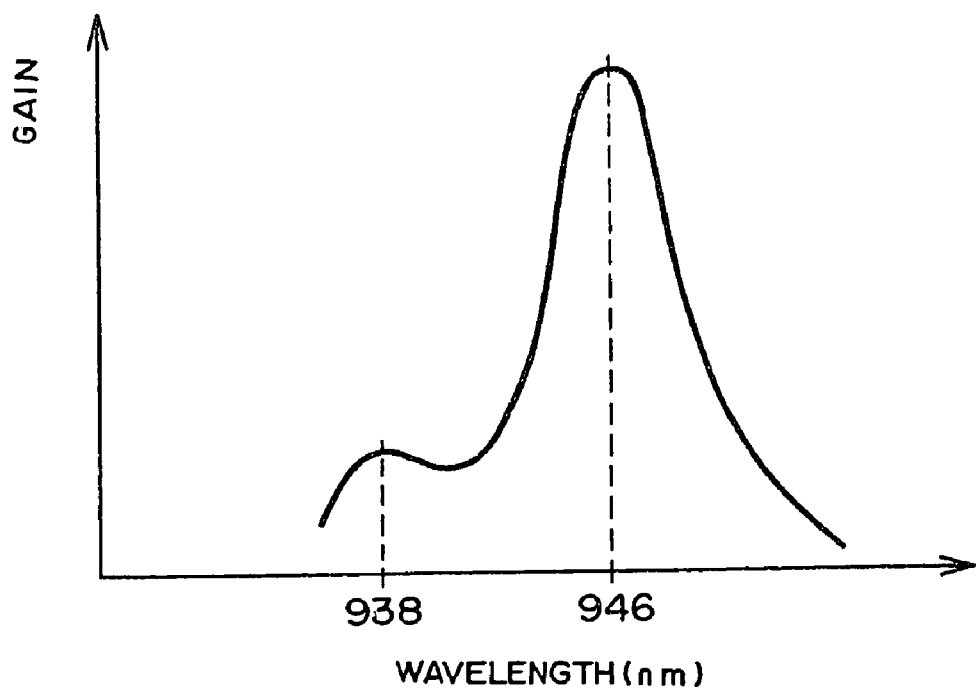
FIG. 8 is a graph illustrating the gain of the laser optical crystal used in the construction of FIG. 7.

FIG. 8 is a graph illustrating the gain of the laser optical crystal used in the construction of FIG. 7. As illustrated in FIG. 7, oscillation can occur at the wavelength of 938 nm, in addition to the wavelength of 946 nm. The gain at the wavelength of 938 nm is lower than the gain at wavelength of 946 nm. However, when the power of the semiconductor laser device 11 (as an excitation light source) is increased, oscillation can also occur at the wavelength of 938 nm.

Figure 9:
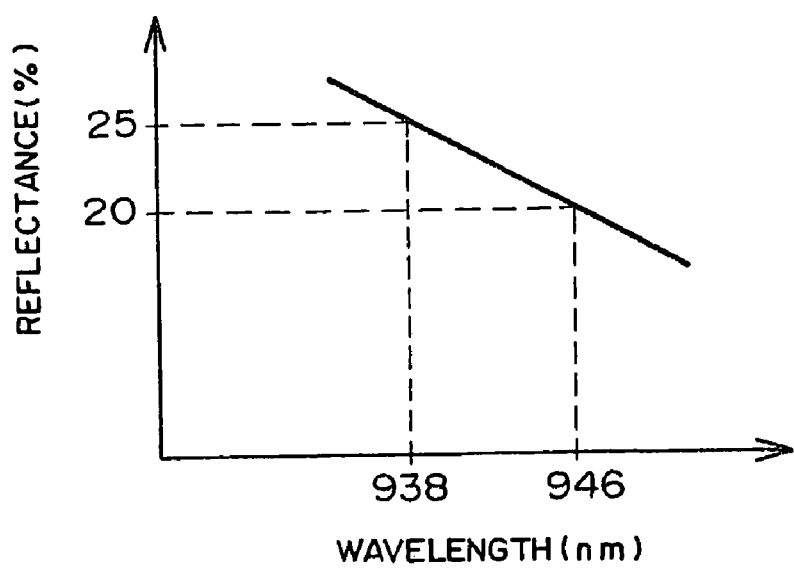
FIG. 9 is a graph illustrating the reflectance of the etalon used in the construction of FIG. 7.

In this embodiment, the above wavelength of 946 nm is required to be oscillated. In order to suppress oscillation at the undesired wavelength of 938 nm, reflectances of both end surfaces (light-transmitting surfaces) 18a and 18b of the etalon 18 are arranged as illustrated in FIG. 9 by appropriately coating the end surfaces 18a and 18b of the etalon 18. That is, the reflectances of the end surfaces 18a and 18b of the etalon 18 at the wavelength of 946 nm are arranged to be 20%, and the reflectances of the end surfaces 18a and 18b of the etalon 18 at the wavelength of 938 nm are arranged to be 25%, which is higher than the reflectances at the wavelength of 946 nm. In this embodiment, the tilt angle of the etalon 18 is also 60'.

When the reflectances of the light-transmitting surfaces 18a and 18b of the etalon 18 are arranged as above, finesse (selectivity of the longitudinal mode) becomes great at the undesired wavelength of 938 nm, and loss increases at the undesired wavelength. Thus, oscillation of the undesired wavelength of 938 nm can be suppressed.

Figure 10:
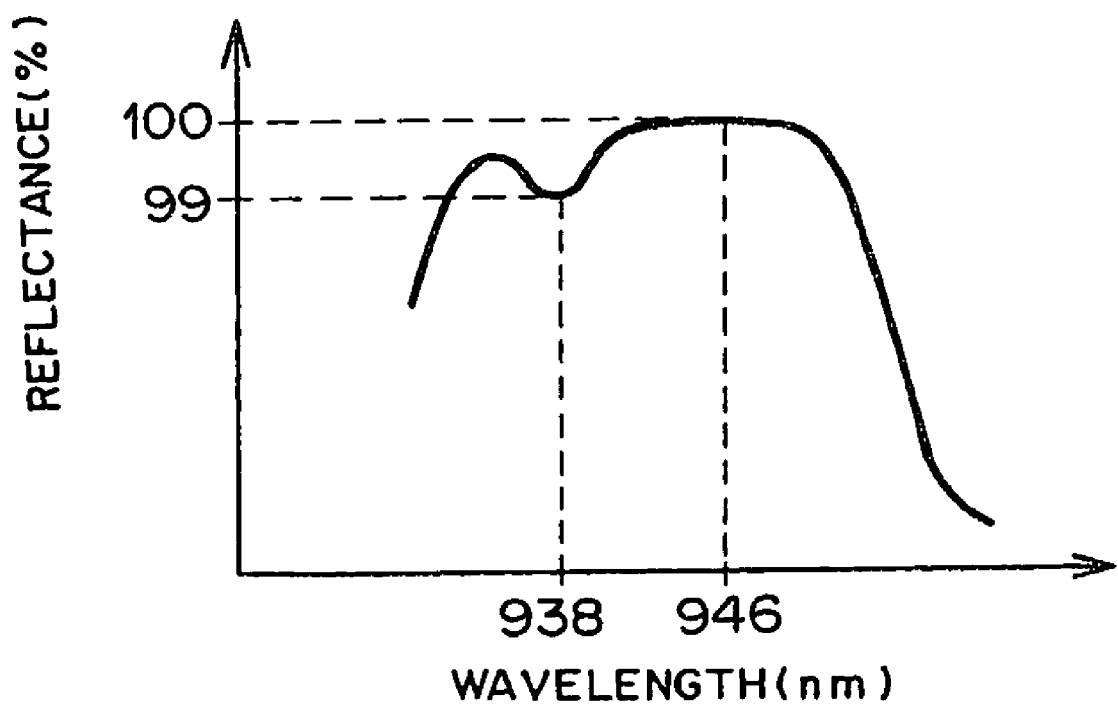
FIG. 10 is a graph illustrating the reflectance of the resonator mirror used in the construction of FIG. 7.

In this embodiment, in order to further suppress the oscillation at the undesired wavelength of 938 nm, the reflectance of the mirror surface 15a of the resonator mirror 15 is arranged as illustrated in FIG. 10. That is, the reflectance of the mirror surface 15a at the wavelength of 946 nm is arranged to be about 100%, and the reflectance of the mirror surface 15a at the wavelength of 938 nm is arranged to be 99%, which is lower than the reflectance at the wavelength of 946 nm.

When the reflectance of the mirror surface 15a is arranged as above, the light having the undesired wavelength of 938 nm can easily pass through the resonator mirror 15 to exit from the resonator, compared with the light having the desired wavelength of 946 nm. Thus, oscillation of the undesired wavelength of 938 nm can be further suppressed.

Other Matters

The present invention can be applied to all types of solid-state laser apparatuses, and the scope of the present invention is not limited to the semiconductor-laser-excited solid-state laser apparatuses or the solid-state laser apparatuses in which wavelength conversion is performed by an optical wavelength conversion element.

In addition, all of the contents of the Japanese Patent Application No. 11 (1999)-70184 are incorporated into this specification by reference.

What is claimed is:

1. A solid-state laser apparatus comprising:
   a resonator in which oscillation of laser light of a predetermined wavelength occurs;
   a solid-state laser medium that emits said predetermined wavelength of light and concurrently at least one other wavelength of light that can oscillate in said resonator; and
   an etalon having a longitudinal selectivity and which is provided in the resonator;
   said etalon has at least one surface through which laser light passes, and said surface has a coating and is arranged so that at least one reflectance of the at least one surface at said predetermined wavelength is smaller than a reflectance of the at least one surface at said at least one other wavelength other than the predetermined wavelength,
   wherein, when the resonator gain curve has a plurality of peaks, the oscillation of the laser light of said predetermined wavelength occurs at a substantially single longitudinal mode.

2. A solid-state laser apparatus comprising a resonator, in which oscillation of laser light at a predetermined wavelength occurs, comprising:
   an etalon having a longitudinal selectivity, said etalon being provided in the resonator;
   a solid-state laser medium that emits said predetermined wavelength of light and concurrently at least one other wavelength of light that can oscillate in said resonator; and
   at least one mirror,
   wherein said at least one mirror is arranged so that at least one reflectance of the at least one mirror at said predetermined wavelength is greater than a reflectance of the at least one mirror at a wavelength other than the predetermined wavelength,
   wherein, when the resonator gain curve has a plurality of peaks, the oscillation of the laser light of said predetermined wavelength occurs at a substantially single longitudinal mode.

3. A solid-state laser apparatus comprising:
   a resonator in which oscillation of laser light of a predetermined wavelength occurs;
   a solid-state laser medium that emits said predetermined wavelength of light and concurrently at least one other wavelength of light that can oscillate in said resonator; and
   an etalon which is provided in the resonator;
   said etalon has at least one surface through which laser light passes, and the etalon is arranged so that at least one reflectance of the at least one surface at said predetermined wavelength is smaller than a reflectance of the at least one surface at said at least one other wavelength other than the predetermined wavelength; and
   said resonator has at least one mirror which is arranged so that at least one reflectance of the at least one mirror at said predetermined wavelength is greater than reflectances of the at least one mirror at said at least one other wavelength other than the predetermined wavelength;
   wherein, when the resonator gain curve has a plurality of peaks, the oscillation of the laser light of said predetermined wavelength occurs at a substantially single longitudinal mode.

4. The solid-state laser apparatus of claim 1, wherein said at least one other wavelength comprises wavelengths other than the harmonics of the predetermined wavelength.

5. The solid-state laser apparatus of claim 2, wherein said at least one other wavelength comprises wavelengths other than the harmonics of the predetermined wavelength.

6. The solid-state laser apparatus of claim 3, wherein said at least one other wavelength comprises wavelengths other than the harmonics of the predetermined wavelength.

* * * * *